United States Patent [19]
Markandey et al.

[11] Patent Number: 5,471,544
[45] Date of Patent: Nov. 28, 1995

[54] CONDITION NUMBER-BASED SMOOTHINS OF OPTICAL FLOW FIELDS

[76] Inventors: Vishal Markandey, 5630 Loring Dr., #157; Bruce E. Flinchbaugh, 6518 Copper Creek Dr., both of Dallas, Tex. 75248

[21] Appl. No.: 883,640

[22] Filed: May 18, 1992

[51] Int. Cl.[6] .............................. G06K 9/36; G06K 9/00; G06K 9/40; H04N 7/18
[52] U.S. Cl. .................... 382/264; 348/169; 348/699
[58] Field of Search .................. 382/1, 41, 54, 382/48; 358/105, 108; 364/516

[56] References Cited

U.S. PATENT DOCUMENTS

| | | | |
|---|---|---|---|
| 4,747,150 | 5/1988 | Kautsson et al. | 382/21 |
| 4,747,151 | 5/1988 | Kautsson et al. | 382/21 |
| 4,747,152 | 5/1988 | Kautsson et al. | 382/21 |
| 4,839,824 | 6/1989 | Ando | 358/107 |
| 4,924,310 | 5/1990 | von Brandt | 358/105 |
| 5,034,986 | 7/1991 | Karmann et al. | 382/4 |
| 5,144,373 | 9/1992 | Moler | 382/9 |

OTHER PUBLICATIONS

Horn "Robot Vision" pp. 278–298 MIT Press, Cambridge Mass 1986.
Horn et al "Determining Optical Flow" Computer Vision, J. M. Brady ed. North–Holland Pub. 1981.
Markandey et al "Multispectial Constraints for Optical Flow Computation", Proc. 3rd. Intl. Conf. on Comp. Vision. 1990.
Girosi et al. "Constraints for the Computation of Optical Flow", Proc. Workshop on Visual Motion, IEEE 1989.
Schunck "Image Flow: Fundamentals and Algorithms" Motion Understanding–Robot & Human Vision, Ch. 2. Kluwer Pub. 1988.

*Primary Examiner*—Joseph Mancuso
*Assistant Examiner*—David Fox
*Attorney, Agent, or Firm*—Robert L. Troike; Richard L. Donaldson

[57] ABSTRACT

An image processor (10) is provided in which imaging data obtained by an image sensor (12) is processed for purposes of detecting motion. An optical flow field generator (16) processes the image data to provide condition number-based smoothed optical flow vectors, and stores those smoothed vectors in memory (18). The optical flow field stored in memory (18) is accessed and further processed by analyzer (20) for purposes of providing users with information on the motion of objects in the image plane of image sensor (12). Such user information may be displayed on a monitor (22).

20 Claims, 2 Drawing Sheets

CONDITION NUMBER-BASED SMOOTHINS OF OPTICAL FLOW FIELDS

TECHNICAL FIELD OF THE INVENTION

This invention relates generally to the field of image processing, and more particularly to an improved method and apparatus for indicating motion.

BACKGROUND OF THE INVENTION

As image processing technology has advanced, so has the number of applications for the technology. In particular, image processing systems have proved extremely useful in moving object indication applications.

In the field of moving object indication, sequential images from a sensor can be analyzed to create an optical flow field. See, e.g., "Determining Optical Flow", B. K. P. Horn and B. G. Schunck, *Computer Vision*, p. 185, North-Holland Publishing, 1981. This optical flow field is an array of vectors indicating the magnitude and direction of movement on a pixel by pixel basis. The optical flow field can then be used to indicate motion or to track a moving object, for example, for purposes of targeting or security monitoring. Other uses of the optical flow field include sensor motion estimation, terrain structure estimation, and autonomous navigation.

Because of noise introduced in acquiring images, errors often exist in the optical flow vectors generated for a given object. For example, if the optical flow vectors corresponding to an object moving across the image plane of an image sensor should be equal at any given point in time, noise introduced by the image sensor could result in non-equal optical flow vectors corresponding to the object. To minimize these errors, smoothing operations are performed on the optical flow vectors. See, e.g., "Image Flow: Fundamentals and Algorithms", B. G. Schunck, *Motion Understanding—Robot and Human Vision*, Chapter 2, Kluwer Academic Publishers, 1988.

Present imaging systems rely on "guesses" made by a human operator to determine certain factors involved in minimizing errors in optical flow fields. Therefore, a need has arisen for a system that performs error minimization (smoothing) based upon the image, rather than on ad hoc determinations by the user of the system.

SUMMARY OF THE INVENTION

In accordance with the present invention, a method and apparatus for image processing is provided which substantially eliminates or reduces disadvantages and problems associated with prior systems for processing images. Image signals are generated using an image sensor and transmitted to an optical flow field generator. The optical flow field generator generates a smooth optical flow field and stores the smooth optical flow field in a memory. The optical flow field generator smooths the optical flow field by generating a condition number for each optical flow vector in the optical flow field and then minimizing the sum of the lack of accuracy and the product of the condition number and lack of smoothness for each optical flow vector. The stored, smooth optical flow field may be processed to indicate or track motion.

An important technical advantage of the present invention inheres in the fact that the optical flow field is smoothed based on a condition number generated for each of the optical flow vectors. The condition number is used as a weighting factor to improve smoothing processing of the optical flow field.

BRIEF DESCRIPTION OF THE DRAWINGS

For a more complete understanding of the present invention and the advantages thereof, reference is now made to the following description taken in conjunction with the accompanying drawing wherein.

DETAILED DESCRIPTION OF THE INVENTION

Figure 1:
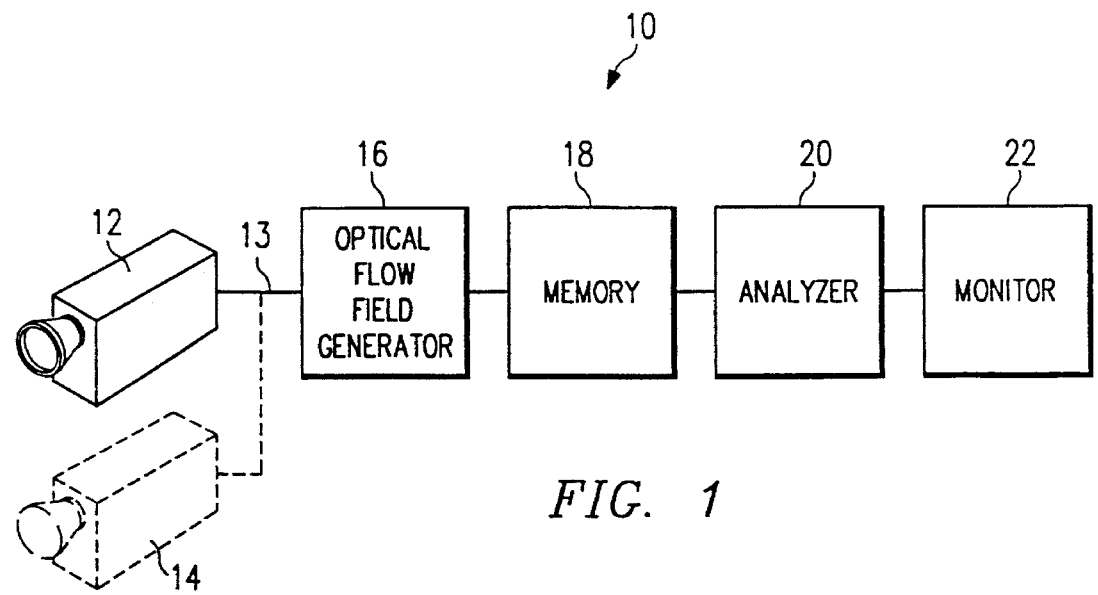
FIG. 1 illustrates a block diagram of an image processing system constructed according to the teachings of the present invention.

FIG. 1 illustrates a block diagram of an imaging system 10 constructed according to the teachings of the present invention. An image sensor 12 is used to sense images and generate image signals to be processed. Image sensor 12 may comprise any one of a number of image sensors. For example, image sensor 12 may comprise forward looking infrared sensors or visible light TV sensors. More than one image sensor can be used with the present invention to provide additional information on the images to be processed. As shown in FIG. 1, image sensor 14 may be used in parallel with image sensor 12. With this additional sensor, two channels of image data are available for processing. Image sensors 12 and 14 may or may not be the same type of image sensor. For example, image sensor 12 may be a forward looking infrared sensor and image sensor 14 may be a green light sensor.

The image signals generated by optical sensors 12 and 14 are transmitted by transmission circuitry 13, such as output drivers, to optical flow field generator 16. Optical flow field generator 16 generates an optical flow field for the images sensed by sensors 12 and 14. The optical flow vector associated with each pixel of image data may be represented as $$O_{ij} = u_{ij}\hat{x} + v_{ij}\hat{y} \qquad (1)$$

wherein $O_{ij}$ is the optical flow vector for a pixel located at row i in column j, and $u_{ij}$ is the magnitude in the x direction of the optical flow vector for the pixel located at row i in column j, $v_{ij}$ is the magnitude in the y direction of the optical flow vector for the pixel located at row i in column j, and $\hat{x}$ and $\hat{y}$ are unit vectors in the x and y directions, respectively. For any pixel, the values for u and v are computed from the following equations $$Au + Bv + C = 0 \qquad (2)$$

$$Du + Ev + F = 0 \qquad (3)$$

A, B, C, D, E, and F are functions of image intensity. Where two image sensors are provided, such as image sensors 12 and 14 of FIG. 1, A, B, C, D, E, and F may comprise first order derivatives of the image intensity of a given pixel. A, B, and C are calculated with respect to the image signal from one sensor, e.g., image sensor 12, such that A is the first order derivative of the image intensity of a given pixel with respect to x, B is the first order derivative of the image intensity with respect to y, and C is the first order derivative of the image intensity with respect to time.

D, E, and F are calculated with respect to the image signal for a separate sensor, e.g., image sensor 14, such that D is the first order derivative of the image intensity with respect to the x direction, E is the first order derivative of the image intensity with respect to the y direction, and F is the first order derivative of the image intensity with respect to time.

If only one image sensor is used, then A, B, C, D, E, and F are second order derivatives. In such a case, A is the second order derivative of the image intensity with respect to x and x, B is the second order derivative of the image intensity with respect to x and y, C is the second order derivative of the image intensity with respect to x and t, D is the second order derivative of the image intensity with respect to y and x, E is the second order derivative of the image intensity with respect to y and y, and F is the second order derivative of the image intensity with respect to y and t. In all of above cases, x and y are spatial coordinates representing the conventional x and y directions on an x-y axis and t represents time. It should be understood that more than two sensors can be used to provide signals for generating optical flow vectors without departing from the teachings of the present invention. For examples of the derivations of Equations 2 and 3, see, e.g., "Determining Optical Flow", B. K. P. Horn and B. G. Schunck, *Computer Vision*, p. 185, North Holland Publishing, 1981; "Multispectral Constraints for Optical Flow Computation", V. Markandey and B. E. Flinchbaugh, *Proc. Third Intl. Conf. on Computer Vision*, p. 38, 1990; and "Constraints for the Computation of Optical Flow", F. Girosi, A. Verri, and V. Torre, Proc. *Workshop on Visual Motion*, IEEE, p. 116, 1989.

Equations 2 and 3 can be solved for u and v provided that the matrix $$\underline{E} = \begin{bmatrix} A & B \\ D & E \end{bmatrix} \quad (4)$$

is non-singular. It can be shown that the condition number of matrix E is $$c = \|E\| \|E^{-1}\|, \quad (5)$$

where $\|E\|$ is the square root of the largest eigenvalue of $E^T E$.

The condition number, c, provides a confidence measure for each optical flow vector that may be used in smoothing the optical flow field. Flow field smoothing is performed by minimizing a weighted sum of two terms, where the first term, $e_s$, is a measure of the lack of smoothness of the flow field, and the second term, $e_c$, is a measure of the lack of accuracy. The two terms, $e_s$ and $e_c$, may be represented by the following formulas.

$$e_s = \iint [u_x^2 + u_y^2 + v_x^2 + v_y^2] dx dy \quad (6)$$

$$e_c = \iint [(u - \bar{u})^2 + (v - \bar{v})^2] dx dy \quad (7)$$

where $u_x$ and $u_y$ are partial deriatives of u with respect to spacial coordinates x and y, and $v_x$ and $v_y$ are partial derivatives of v with respect to spacial coordinations x and y. The magnitude of the initial flow vector calculated according to formulas 2 and 3 in the x and y directions are $\bar{u}$ and $\bar{v}$, respectively.

Smoothing is performed by minimizing the weighted sum of Equations 6 and 7, as given by Equation 8 below:

$$\epsilon = \iint (c(x_c, y_c)[u_x^2 + u_y^2 + v_x^2 + v_y^2] + [(u - \bar{u})^2 + (v - \bar{v})^2]) dx dy \quad (8)$$

where $c(x_c, y_c)$ is the central pixel in the area of summation. It can be shown that Equation 8 may be minimized using the following iterative equations:

$$u^{n+1}(i,j) = \frac{1}{1 + 20c(i,j)} [u^n(i,j) + c(i,j)(u^n(i-1,j-1) + \quad (9)$$

$$u^n(i+1,j-1) + u^n(i-1,j+1) + u^n(i+1,j+1)) +$$

$$4c(i,j)(u^n(i,j-1) + u^n(i,j+1) + u^n(i+1,j) + u^n(i-1,j))]$$

$$v^{n+1}(i,j) = \frac{1}{1 + 20c(i,j)} [v^n(i,j) + c(i,j)(v^n(i-1,j-1) + \quad (10)$$

$$v^n(i+1,j-1) + v^n(i-1,j+1) + v^n(i+1,j+1)) +$$

$$4c(i,j)(v^n(i,j-1) + v^n(i,j+1) + v^n(i+1,j) + v^n(i-1,j))]$$

where n is the number of iterations. As can be seen from Equation 8, the condition number of the E matrix for a given pixel is multiplied by the measure of the lack of smoothness at that pixel as a weighting factor. Use of the condition number as a weighting factor in Equation 8 provides for a weighting factor that is based on the image signal rather than ad hoc determinations by the user of the image processing system.

Use of Equations 9 and 10 to calculate the optical flow vectors for an optical flow field provides an improved smoothing technique for image analysis systems performing motion indication or analogous functions.

Figure 3:
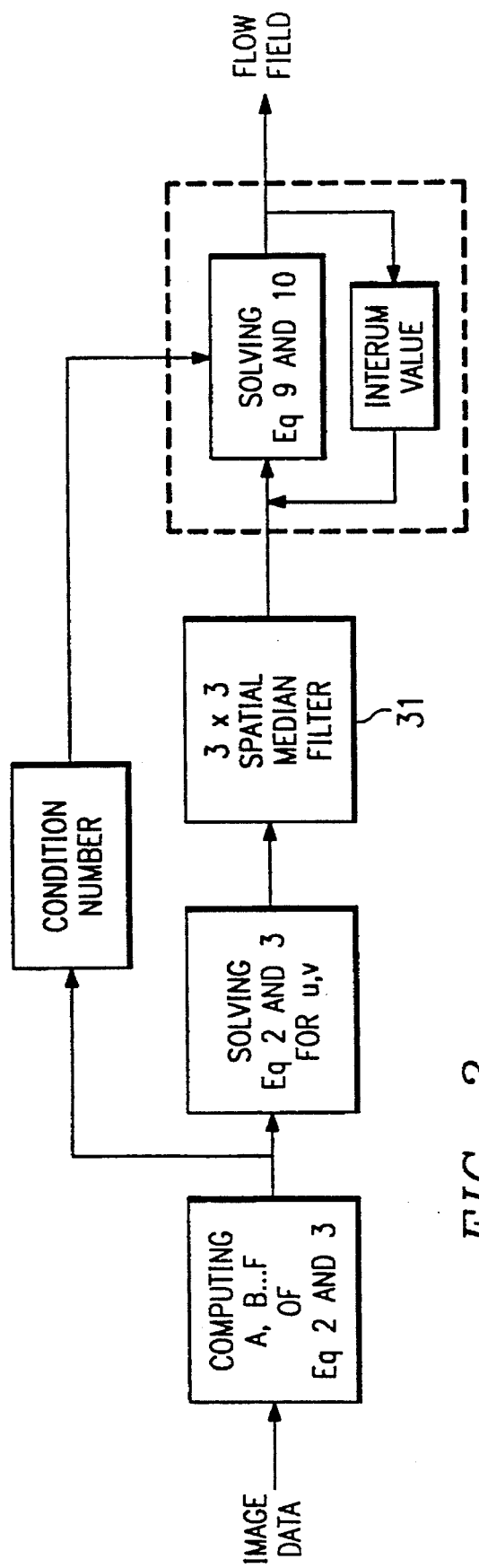
FIG. 3 illustrates in more detail Optical Flow Field Generator of FIG. 1.

According to one embodiment of the present invention shown in FIG. 3, before using the smoothing functions of Equations 9 and 10, a median filter 31 can be used to eliminate noise spikes from the original optical flow vectors calculated according to Equations 2 and 3. Such a median filter could be a 3×3 spatial extent median filter, although filters of other sizes may also be used. The optical flow vectors resulting from such median filters could then be smoothed according to Equations 9 and 10.

The condition number-based optical flow field smoothing described above can be implemented on a general purpose computer capable of converting the video signals to digital values and then performing the smoothing processing. In the alternative, a dedicated microprocessor based system or application specific integrated circuit could be used to perform the condition number-based smoothing described above.

The number of iterations of Equations 9 and 10 performed depends on the requirements of imaging system 10. The number of iterations of Equations 9 and 10 could be determined by the speed of the system performing the optical flow field generation. For example, if each pixel is to be smoothed 30 times a second, the number of iterations may depend upon the length of time required by optical flow field generator 16 to perform the smoothing operation for a particular pixel. As another example, since each iteration of Equations 9 and 10 reduces the error expressed in Equation 7, iterations of equations 9 and 10 may be stopped when the rate of error reduction with successive iterations becomes insignificantly small, as in the case of asymptotic convergence, or if the error actually starts increasing with successive iterations after reaching a minima point.

Once the optical flow field has been generated by optical flow field generator 16, the optical flow field is stored in a memory 18. Memory 18 may comprise, for example, a random access memory. The form of the data stored in memory 18 may be in the form of a two-dimensional array, wherein the magnitude in both the x and the y directions of the optical flow vectors for each pixel are stored. The magnitudes in the x and y direction for each optical flow field vector may be real numbers.

Memory 18 is accessed by analyzer 20. Analyzer 20, in general, processes the optical flow field stored in memory 18 for the purpose required by imaging system 10, and may comprise a microprocessor based system operating to determine motion based on the magnitude and direction of the vectors making up the optical flow field. In particular, analyzer 20 may comprise a moving target indication system, in which information on moving targets may be provided through monitor 22 to an operator of imaging system 10. It should be recognized that monitor 22 shown in FIG. 1 is for purposes of example only, and could be another type of output device, such as a printer or other device designed to operate in response to a given type of movement. Another example of analyzer 20 is a robust tracking system, in which moving objects are tracked, for example, for targeting purposes.

Figure 2:
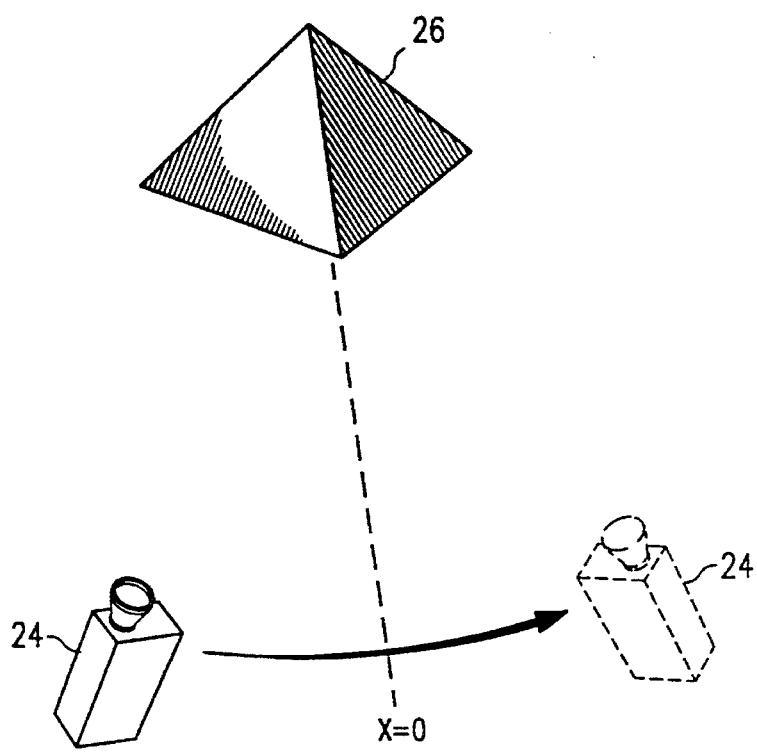
FIG. 2 illustrates detection of terrain or object shape according to one embodiment of the present invention.

According to one embodiment of the present invention, analyzer 20 may comprise a terrain structure or object shape processor. FIG. 2 illustrates one embodiment of the operation of terrain or object shape detection by sensor motion. As shown in FIG. 2, a sensor 24 is moved in a known pattern, resulting in changes in the relative position of an object 26 with respect to sensor 24. This change in relative position is equivalent to motion, and the shape of the object (or the terrain structure) can be detected by analyzing the optical flow fields generated during sensor movement. In this way, three-dimensional terrain structures or object shapes may be measured, and representations of these shapes or structures, such as maps, may be created. Another technique by which object shape may be estimated is by analyzing intensity changes caused by lighting changes.

It should be understood that "motion indication", as used herein, describes both motion of objects and sensor motion, and thus includes the example of three-dimensional representation generation. Moreover, since the teachings herein relate to image intensity, "motion indication" also includes detection of intensity or shading changes.

In summary, an imaging system is provided in which image signals generated by image sensors are processed and optical flow vectors are produced. These optical flow vectors are further processed by a condition number-based smoothing operation. These smoothed optical flow vectors are then accessed to provide information, such as motion or terrain structure information, on the image sensed by the image sensors.

Although the present invention has been described in detail, it should be understood that various changes, substitutions and alterations can be made without departing from the spirit and scope of the invention as defined by the appended claims.

What is claimed is:

1. A method of processing images, comprising the steps of:

generating an image signal in an image sensor;

transmitting the image signal to an optical flow field generator device;

generating a plurality of optical flow vectors in an initial flow field in said generator device;

generating in said generator device a condition number for each of the optical flow vectors dependent on an image intensity of said image signal at each associated pixel location;

smoothing in said generator device the initial optical flow field by minimizing each sum of a lack of accuracy and a product of the condition number and a lack of smoothness for each optical flow vector;

storing the smoothed optical flow field in a memory; and processing the smoothed optical flow field.

2. The method of claim 1 wherein said step of processing comprises the step of tracking the motion of an object depicted in a portion of the image.

3. The method of claim 1, wherein the memory comprises a random access memory.

4. The method of claim 1, and further comprising the step of median filtering the initial optical flow field prior to said step of smoothing the optical flow field.

5. The method of claim 1, wherein said step of processing comprises indicating to an operator any moving objects sensed by the image sensor.

6. The method of claim 2, and further comprising the step of targeting moving objects sensed by the image sensor.

7. The method of claim 1, and further comprising the step of moving the image sensor in a predetermined pattern; and said step of processing comprises the step of generating a three-dimensional representation of images sensed by the image sensor.

8. A method of processing images, comprising the steps of:

generating an image signal in an image sensor;

transmitting the image signal to an optical flow field generator device;

generating a plurality of optical flow vectors in an initial flow field in said generator device;

generating at said generator device a condition number for each of the optical flow vectors dependent on an image intensity of said image signal at each associated pixel location;

smoothing the initial optical flow field by minimizing each sum of the lack of accuracy and the product of the condition number and the lack of smoothness for each optical flow vector in said generator device; and processing said optical flow filed to indicate or track motion.

9. An image processor, comprising:

an image sensor device for generating an image signal;

circuitry for transmitting said image signal to an optical flow field generator;

said optical flow field generator being operable to generate a condition number-based smoothed optical flow field from said image signal;

said condition number-based flow field being dependent on a condition number dependent on the image intensity of said image signal at each signal location of an associated optical flow vector;

a memory coupled to said optical flow field generator for storing said smoothed optical flow field; and an analyzer for processing said smoothed optical flow field.

10. The image processor of claim 9, wherein said optical flow field generator device is operable to generate a first optical flow field comprising a plurality of optical flow vectors and is further operable to generate a condition number for each of the optical flow vectors, said condition number being dependent on an image intensity of said image signal at each associated pixel location, said smoothed optical flow field generated by minimizing each sum of a lack of accuracy and a product of the condition number and a lack of smoothness for each optical flow vector.

11. The image processor of claim 10, and further comprising a median filter for filtering the optical flow field before generating said smoothed optical flow field.

12. The image processor of claim 9, wherein said analyzer comprises a moving target indicator for indicating to an operator any moving objects sensed by said image sensor.

13. The image processor of claim 12, and further comprising a monitor for displaying the indication of object motion.

14. The image processor of claim 9, and further comprising a tracking system for tracking moving objects sensed by said image sensor.

15. The image processor of claim 9, and further comprising an image sensor moving device for moving the image sensor in a predetermined pattern, and wherein said analyzer is operable to generate a three-dimensional representation of images sensed by the image sensor.

16. A method of processing images, comprising the steps of:

generating an image signal in an image sensor;

transmitting the image signal to an optical flow field generator device;

generating a plurality of optical flow vectors in an initial flow field in said generator device;

generating in said generator device a condition number c for each of optical flow vectors (u,v) where:

$$c = \|E\| \|E^{-1}\|$$

where $\|E\|$ is the square root as the largest eigenvalue of $E^T E$, where matrix E is:

$$E = \begin{bmatrix} A & B \\ D & E \end{bmatrix}$$

$E_T$ is the transpose of E or $$E_T = \begin{bmatrix} A & D \\ B & E \end{bmatrix}$$

and the terms A,B,D,E are derivatives of image intensity at the pixel location associated with the flow vector and are determined from:

$$Au + Bv + C = 0$$

$$Du + Ev + F = 0$$

used to solve for (u,v);

smoothing the initial optical flow field by minimizing each sum of a lack of accuracy and a product of the condition number and a lack of smoothness for each optical flow vector; and processing said optical flow field to indicate or track motion.

17. The method of claim 1, and further comprising the step of median filtering the optical flow field prior to said step of smoothing the optical flow field.

18. An image processor, comprising:

an image sensor for generating an image signal;

circuitry for transmitting said image signal to an optical flow field generator;

said optical flow field generator including means for generating a plurality of optical flow vectors in an initial optical flow field from said image signal, means for generating a condition number for each of said optical flow vectors having a number value dependent on an image intensity of said image signal at each associated pixel location, and means responsive to said condition number and said initial optical flow field for generating a smoothed optical flow field by minimizing each sum of a lack of accuracy and a product of said condition number and a lack of smoothness for each optical flow vector; and circuitry for processing said smoothed optical flow field to indicate or track motion.

19. The image processor of claim 18 wherein said condition number associated with an optical flow vector (u,v) is:

$$C = \|E\| \|E^{-1}\|$$

where $\|E\|$ is the square root as the largest eigenvalue of $E^T E$, where matrix E is:

$$E = \begin{bmatrix} A & B \\ D & E \end{bmatrix}$$

$E_T$ is the transpose of E or $$E_T = \begin{bmatrix} A & D \\ B & E \end{bmatrix}$$

and the terms A,B,D,E are derivatives of image intensity at the pixel location associated with the flow vector and are determined from:

$$Au + Bv + C = 0$$

$$Du + Ev + F = 0$$

used to solve for (u,v); and smoothing the optical flow field by minimizing each sum of a lack of accuracy and a product of the condition number and a lack of smoothness for each optical flow vector.

20. The image processor of claim 10, and further comprising a median filter for filtering the optical flow field before generating said smoothed optical flow field.

* * * * *